United States Patent [19]

Vuorenoja

[11] Patent Number: 4,723,900

[45] Date of Patent: Feb. 9, 1988

[54] EXTRUDER FOR CASTING CONCRETE SLABS

[75] Inventor: Teuvo Vuorenoja, Valkeakoski, Finland

[73] Assignee: KT-Suunnittelu Oy, Valkeakoski, Finland

[21] Appl. No.: 834,529

[22] Filed: Feb. 28, 1986

[30] Foreign Application Priority Data

Mar. 1, 1985 [FI] Finland ........................... 850837

[51] Int. Cl.[4] ........................................ B29C 47/50

[52] U.S. Cl. ........................... 425/204; 425/205; 425/208; 425/209; 425/376 B

[58] Field of Search ............... 264/177 R, 70; 366/76, 366/78; 425/204–209, 376 R, 376 B

[56] References Cited

U.S. PATENT DOCUMENTS

| | | | |
|---|---|---|---|
| 2,810,159 | 10/1957 | Teichmann | 425/207 X |
| 3,788,612 | 1/1974 | Dray | 425/208 X |
| 3,865,354 | 2/1975 | Burpulis et al. | 366/76 |
| 4,022,556 | 5/1977 | Goetjen | 425/207 X |
| 4,119,025 | 10/1978 | Brown | 425/204 X |
| 4,461,734 | 7/1984 | Jones et al. | 425/207 X |

FOREIGN PATENT DOCUMENTS

| | | | |
|---|---|---|---|
| 2024825 | 11/1970 | Fed. Rep. of Germany | 425/206 |
| 638691 | 4/1962 | Italy | 425/206 |
| 5655 | 2/1981 | Japan | 425/204 |

*Primary Examiner*—Robert Spitzer

*Attorney, Agent, or Firm*—Birch, Stewart, Kolasch & Birch

[57] ABSTRACT

An extruder for the manufacture of concrete slabs, particulary hollow slabs, in a movable relationship with a casting mold. The extruder includes a feed hopper, at least one feeder, particularly an auger for generating internal pressure in the cast concrete, and at least one core member for generating a desired slab cross-section. The extruder in accordance with the invention has an assembly of at least one contoured core section which performs a combined movement of oscillatory rotation and longitudinal reciprocation to generate inside the molding space a compacting shear action in the concrete mix. The extruder in accordance with the invention is especially applicable for the production of profiled concrete objects with elongated shape at low noise and vibration levels.

20 Claims, 7 Drawing Figures

EXTRUDER FOR CASTING CONCRETE SLABS

BACKGROUND OF THE INVENTION

The present invention relates to an extruder for casting concrete slabs.

In a typical concrete slab extruder the concrete mix is dropped onto auger flights which force the concrete under pressure onto the casting bed. The bottom side of the concrete slab cross-section is defined by the form of the casting bed, the other sides being defined by the side and top mold plates of the extruder. The hollow channels or cavities in the slab are formed by the core members which follow the augers. A prior-art extruder with core members between the augers also exists.

The compacting of concrete is done with high-frequency vibrators. The vibration is then applied to the core members, the mold, the side mold plates, or the top mold plate, and in some cases to all of these. This extruder construction is widely used but has, e.g., the following disadvantages: The vibration compaction process generates heavy noise; the vibrating mechanism has a complicated construction and contains several wearing parts; and the concrete compaction is uneven between the thinner and thicker wall sections.

In addition, a further prior-art construction acting under the following principle exists.

In a first phase of the process, the extruder feeds a layer of concrete onto the casting bed. This forms the base section of the slab shell. In a next phase, another layer of concrete is fed between the tube-formed core members of the extruder. The core members perform a cyclic longitudinal movement to improve the homgenization of the concrete mix. In addition, the core members are vibrated at a high frequency to compact the concrete. The extruder then feeds a third layer of concrete over the core members, and finally a vibrating trowel beam performs the levelling and compaction of the upper surface.

Though the construction described above is widely used, it has, e.g., the following disadvantages: the concrete must be fed in several phases before the mold is sufficiently filled; the machine is not operable with a sufficiently low slump concrete mix; and the compacting vibration generates heavy noise.

SUMMARY OF THE INVENTION

The object of the present invention is to overcome the disadvantages found in the prior-art constructions and to provide a completely new type of extruder which is especially applicable for use with low slump concrete mixes.

The extruder according to the present invention feeds the concrete by auger flights or other feeding devices into a pressurized space. The core or mandrel members and/or surrounding nozzle parts in the pressurized space are so formed that, by a cyclic movement in the entire cross-section of the cast concrete, they generate a shear-action that compacts the concrete mix. To provide the concrete with an efficient compaction and sufficiently high casting speed, the reciprocating movement of the core members is combined with an oscillating rotational movement about the longitudinal axes of the core members. Hence, the concrete compacting is not carried out by conventional vibrating but by shear compaction caused by the combined axial and rotatioal movement of the core members, whose surfaces are provided with longitudinal fins or grooves.

The extruder in accordance with the invention is ideally suited for the production of concrete slabs in a concrete products factory with a technology fulfilling modern requirements. The extruder is capable of fabricating hollow slabs or other longitudinally profiled slabs. It is expecially applicable for use with low slump concrete mixes and its compaction method does not generate noise and vibration. In addition, the extruder also provides the technological facilities for manufacturing new types of concrete products.

In the following, the invention will be examined in more detail by means of the exemplifying embodiments which are given by way of illustration only as applied to a hollow slab extruder in accordance with the attached drawings. The invention is also applicable as such for the casting of other types of profiled slabs.

DETAILED DESCRIPTION OF THE INVENTION

The extruder shown in FIGS. 1 to 5 incorporates a concrete feed hopper 1 from which the concrete mix flows onto auger flights 2. The augers 2 ensure an even feed and the required pressure for the concrete mix.

Figure 1:
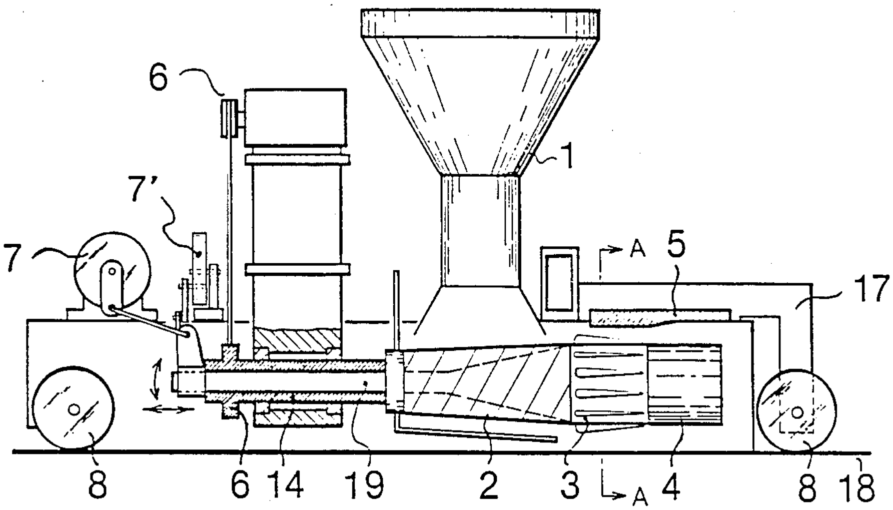
FIG. 1 shows a side view of one embodiment of the extruder in accordance with the invention.

As shown in FIG. 1, the augers 2 are located in line with the consecutive core or mandrel members 3 and 4 but the equipment can also be configured so that the augers 2 are inclined to feed the mix obliquely from above. The extruder can also be implemented by replacing the augers by an alternative pressure generating feeder device. The outlet end of the auger flights 2 in the extruding machine incorporates a seal section 9 which prevents concrete mix from penetrating into the seam between the rotating auger 2 and the cyclically clockwise/counterclockwise turning core member 3. The seal construction itself can be of any conventional type: a labyrinth seal, resilient rubber seal, lip seal, etc.

The first actuators 7 mounted on the frame work 17 cause the combinations of auger 2, core member 3, and extension 4 to move longitudinally in a reciprocating manner known per se. Adjacent core combinations may be moved synchronously in opposite directions. As the second actuators 7' at the same time, via the shaft 19 (FIGS. 3*a* and 3*b*), cause the core members 3 to rotate about their axes in a reciprocating manner, a combined helical movement of the fins 10 (FIG. 4*a*) or grooves 10' (FIG. 4*b*) is achieved. This movement has a very efficient compacting effect on the surrounding concrete.

Figure 3A:
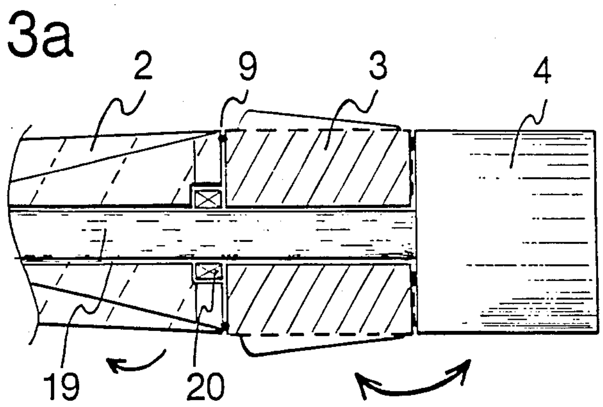
FIGS. 3*a* and 3*b* show sectional views of two embodiments of an auger flight and its core member, respectively.

In the embodiment of FIG. 3*a,* the core member 3 and its extension 4 rotate together.

Figure 3B:
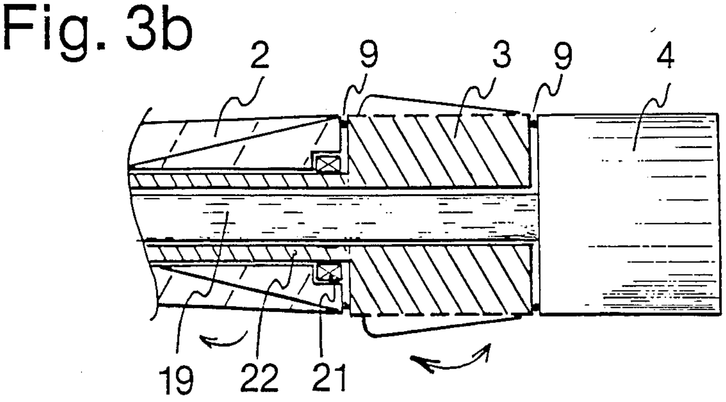

In the embodiment of FIG. 3*b,* the extension 4 is independent of the core member 3 and may not rotate at all or may, e.g., rotate with the auger 2. This construction requires an additional hollow shaft 22.

Figure 5:
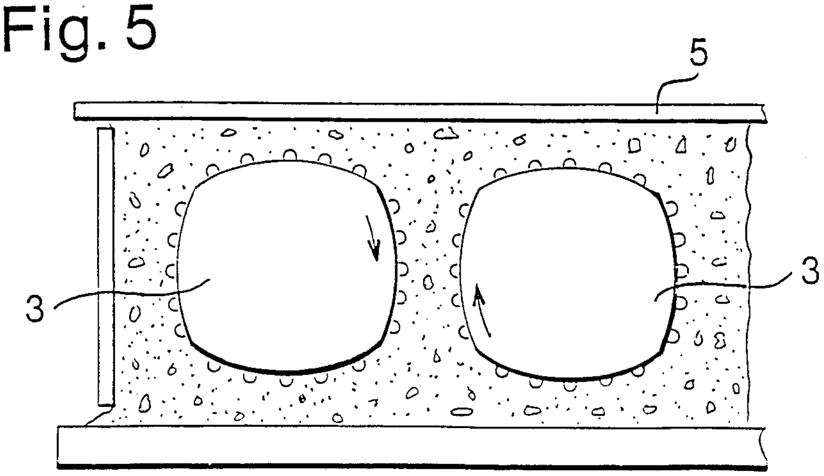
FIG. 5 shows the mixing process generated in the concrete mix by the shearing action of the reciprocal rotational movement of two adjacent core members.

In the direction of the concrete flow, the longitudinally finned and contoured section of the forming member 3 follows the seal 9. The longitudinally finned core member section is preferably contoured with fins 10 tapering in the concrete mix flow direction for easier releasing of mix. The cross-sectional profile of the fin is preferably triangular (FIG. 2) or semicircular (FIG. 5). When the rotational movement of the core members 3 about their longitudinal axes is arranged cyclically oscillating, an internal shear in the concrete mix is obtained which compacts the concrete under pressure.

The length of the core members and the height of the fins 10 influence the mixing degree, and a less contoured forming of the finned section with shorter length of the core member 3 is preferably used for thin sections of the slab. Correspondingly, more pronounced contouring and longer core members can be used at the massive sections of the slab.

Figure 4A:
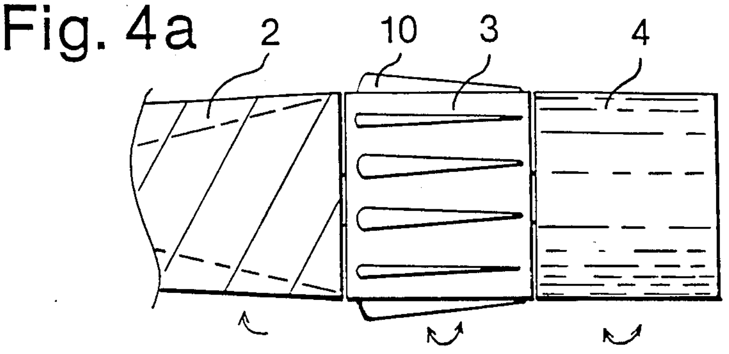
FIGS. 4*a* and 4*b* show in detail the surface configuration of two embodiments of the core member, respectively.
Figure 4B:
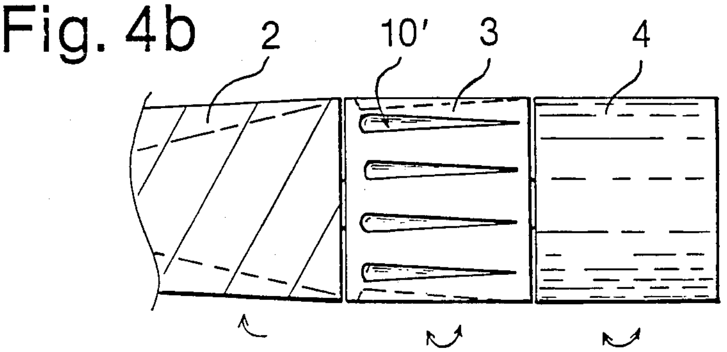

A similar effect can be achieved by the embodiment according to FIG. 4*b*, in which the cylindrical surface of the core member is provided with longitudinal grooves 10′ instead of fins. The grooves 10′ are broader and deeper at the end of the core member facing the auger 2, tapering towards the end facing the extension 4.

The form of the longitudinal fin may vary from the aforementioned alternatives. The longitudinal fin can also be constructed from a row of thin, parallel-mounted steel strips whose heights vary according to the thickness variations of the extruder object so that the strip-like longitudinal fin is lower for a thin cross section and higher for a more massive cross section, respectively.

Figure 2:
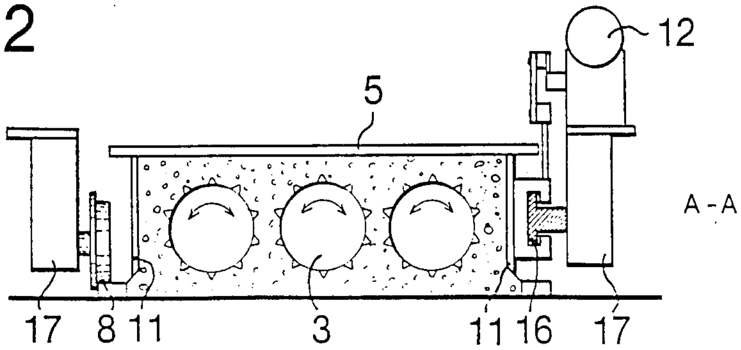
FIG. 2 shows a schematic end view of the extruder of FIG. 1.

The most desirable circumferential amplitude for each revolving stroke of the finned core member 3 about its longitudinal axis is about 1 to 2 mm, with a frequency of about 10 . . . 1000 strokes/s (Hz). Naturally, the suggested reference value can be changed. The section 3 is followed by an extension 4 which gives the core its final shape. The cross-section of the core member 3 and its extension 4 can vary depending on the desired cross-section of the cavity. In FIG. 2 the cross-section is circular and in FIG. 5 it has the form of a TV screen.

The oscillating rotatational movement of the core members 3 and their extensions 4 is achieved by an actuator 7′. The rotational movement of the auger flights 2 is provided by the actuator and transmission 6. The guide section 14 permits different timings for the movements of the auger flights and core members in relationship with the extruder framework 17.

The side mold plates 11 form the side profile of the slab.

The machinery is installed in the framework 17, which moves on carrier wheels 8 over the casting bed 18. Naturally, the machinery can be complemented in some parts by conventional high-frequency vibration, e.g., by external vibrators arranged on the top mold plate 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An extruder for casting hollow concrete slabs comprising:
   - a feed hopper means operatively connected to a feeder means for introducing concrete mix on to said feeder means;
   - said feeder means for feeding said concrete mix from said feed hopper means to a mold cavity means and for exerting predetermined pressure on said concrete mix;
   - a core means provided within said mold cavity means and adjacent to said feeder means for creating a predetermined hollow portion within said concrete mix and for generating internal shear to compact said concrete mix, said core means being provided with surface deviations aligned along its longitudinal axis for efficiently compacting said concrete mix;
   - a reciprocating actuator means operatively connected to said core means for reciprocating said core means along the longitudinal axis of said core means; and
   - an oscillating actuator means operatively connected to said core means for rotating said core means in an oscillating manner while said core means is reciprocated by said reciprocating actuator means.

2. An extruder as claimed in claim 1, wherein the feeder means and the core means are arranged to perform common, simultaneous axial movement.

3. An extruder as claimed in claim 2, wherein the core means comprises a first core section means and an extension means operatively connected to said first core section means.

4. An extruder as claimed in claim 3, wherein the surface deviations comprise ridge-like structures extending substantially over the whole length of the first core section.

5. An extruder as claimed in claim 4, wherein the ridge-like structures are fins extending radially from the surface of the first core section and tapering in the direction of the extension means.

6. An extruder as claimed in claim 5, wherein the fins comprise thin steel strips.

7. An extruder as claimed in claim 4, wherein the ridge-like structures have a substantially triangular or semi-circular cross-section.

8. An extruder as claimed in claim 4, wherein the surface deviations comprise grooves extending substantially over the whole length of the first core section means.

9. An extruder as claimed in claim 8, wherein the surface deviations comprise grooves which taper in the direction of the extension means.

10. An extruder as claimed in claim 3, wherein the feeder means is an auger and wherein a seal means is provided in the seam between the first core section means and said auger for preventing concrete mix from penetrating into said seam.

11. An extruder as claimed in claim 10, wherein the seal means is a labyrinth seal, a rubber seal, or a lip seal.

12. An extruder as claimed in claim 3, wherein the first core section means and the extension means operate with independent axial movement 13. An extruder as claimed in claim 12, wherein the first core means is operatively connected to the reciprocating actuator means and the oscillating actuator means by a hollow first core shaft means and wherein the extension means is operatively connected to a second core shaft means which independently actuates said extension means and extends through the hollow portion of said first core shaft means.

14. An extruder as claimed in claim 1, wherein the surface deviations are evenly distributed around the circumference of the surface of the core means.

15. An extruder as claimed in claim 1, wherein the feeder means is operatively connected to a transmission means which actuates the axial movement of said feeder means independently of the core means.

16. An extruder as claimed in claim 1, wherein the cross-section of the core means is circular.

17. An extruder as claimed in claim 1, wherein the cross-section of the core means is in the shape of a rounded quadrilateral.

18. An extruder as claimed in claim 1, wherein said extruder is provided with plural core means and plural feeder means.

19. An extruder as claimed in claim 1, wherein the core means is capable of rotating about 1 to 2 mm with each oscillating stroke with a frequency of about 10 to 1000 strokes per second.

20. An extruder as claimed in claim 1, wherein a vibrator means is operatively associated with the mold cavity means for vibrating the concrete mix.

* * * * *